United States Patent

Martin et al.

[15] 3,672,000
[45] June 27, 1972

[54] MACHINE TO DE-BONE CHICKEN THIGHS

[72] Inventors: Eugene G. Martin, Stevens; Edwin C. Mohler, Willow Street, both of Pa.

[73] Assignee: Victor F. Weaver, Inc., New Holland, Pa.

[22] Filed: Aug. 31, 1970

[21] Appl. No.: 68,260

[52] U.S. Cl. ....................................................... 17/11, 17/1
[51] Int. Cl. ................................... A22c 21/00, A22c 17/04
[58] Field of Search .......................................... 17/1 G, 11, 46

[56] References Cited

UNITED STATES PATENTS

| | | | |
|---|---|---|---|
| 3,510,908 | 5/1970 | Segur et al. | 17/11 |
| 2,893,051 | 7/1959 | Massengill | 17/1 G |

Primary Examiner—Lucie H. Laudenslager
Attorney—C. Hercus Just

[57] ABSTRACT

A machine for removing the bone from chicken thighs by engaging the ball at one end of the thigh bone and moving stripper members into engagement with the thigh bone immediately below the gripping means, and effecting longitudinal movement between the gripping means and the stripper members until the stripper members move the full length of the bone and engage and move around the ball at the opposite end of the thigh bone, to complete the removal of the meat from said bone.

20 Claims, 17 Drawing Figures

INVENTORS
EUGENE G. MARTIN
EDWIN C. MOHLER

ATTORNEY

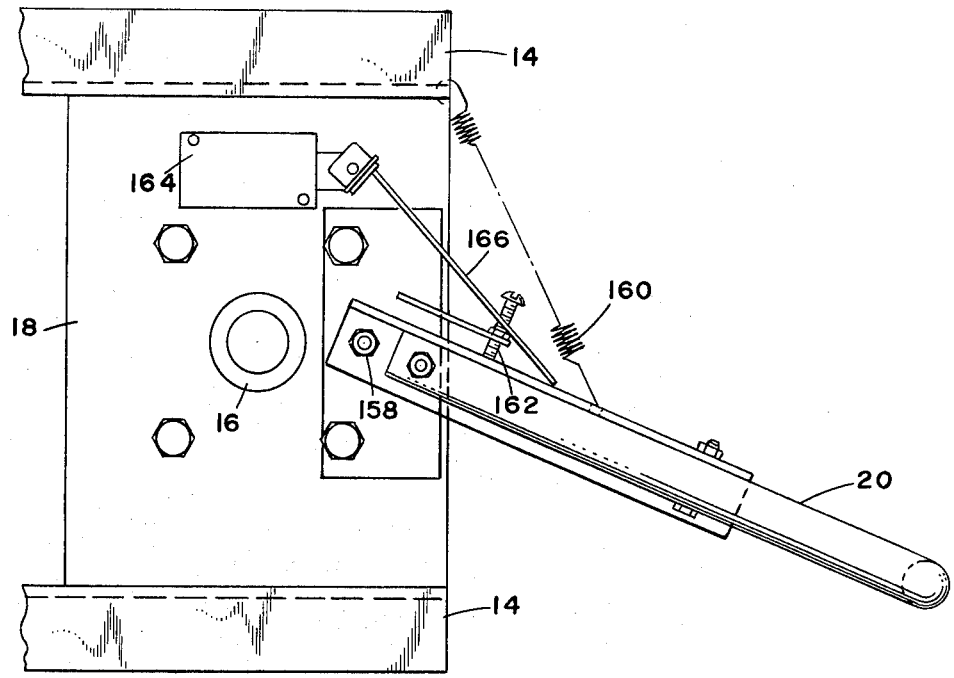
FIG. 3
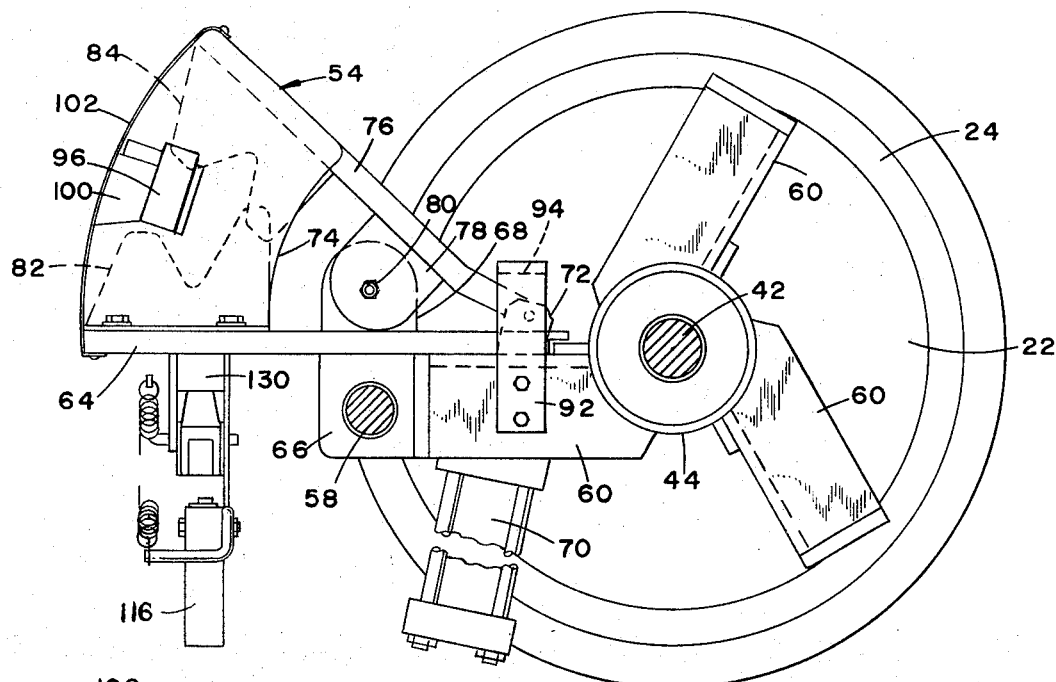
FIG. 4
FIG. 4A
INVENTORS
EUGENE G. MARTIN
EDWIN C. MOHLER
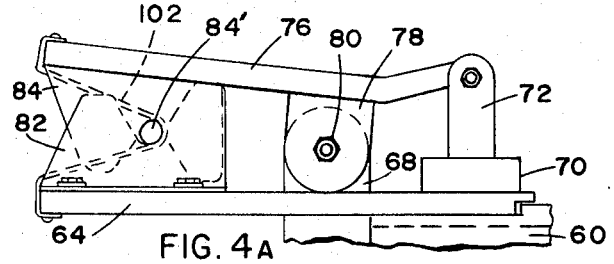
BY
ATTORNEY

INVENTORS
EUGENE G. MARTIN
EDWIN C. MOHLER

BY
ATTORNEY

INVENTORS
EUGENE G. MARTIN
EDWIN C. MOHLER

BY

ATTORNEY

INVENTORS
EUGENE G. MARTIN
EDWIN C. MOHLER

BY *C. Herranfust*

ATTORNEY

MACHINE TO DE-BONE CHICKEN THIGHS

BACKGROUND OF THE INVENTION

The operation of modern meat packing and handling establishments in recent years has resulted in the development of a number of machines for removing the bone from various types of meat, such as hams, chicken legs, and the like. It is well-known that after certain types of meat have been cooked, the separation of the meat from the bones may be achieved much more easily than prior to the meat being cooked. Nevertheless, cooking of various types of meats usually results in the loss of weight and thus it frequently is more desirable to remove the bone before the meat is cooked. To accomplish this heretofore, it usually has been necessary to cut the meat longitudinally along the bone in order to gain access thereto and this has many objections, but nevertheless has been the usual manual manner of de-boning certain types of meat.

One of the difficulties encountered in removing the bones from certain types of meat, such as in ham, and chicken legs, is the fact that there is a ball-and-socket joint in a ham bone intermediately of the ends thereof. Similarly, there is a ball-and-socket joint between the thigh and lower portion of the leg of a chicken. In attempting to strip such bones from such types of meat, difficulties have been encountered in moving the stripping means along the surfaces of such ball-and-socket joint.

One example of mechanism to remove the bone from a ham, including means to account for the ball-and-socket joint in the bone of the ham comprises the subject matter of U.S. Pat. No. 2,857,619 in the name of Massengill, dated Oct. 28, 1958. One end of the bone is engaged to pull the bone from the ham while blade means, which are foot-operated, prevent movement of the body of the ham, and incidentally, closely engage one side of the ball-and socket joint of the bone as it is being removed. Under such circumstances, however, it is necessary to utilize such foot-operated means to effect stripping of the meat from around the ball-and-socket joint of the ham bone and in a not very satisfactory manner.

With regard to stripping the meat from chicken legs comprising connected thighs and lower legs, a number of machines have been devised to accomplish this in different ways. U.S. Pat. No. 2,897,536 to Bergstron et al., dated Aug. 4, 1959, employs pairs of stripping rolls which engage the meat of the chicken leg while the leg is moved along by an endless chain engaging one end of the leg bone.

Another U.S. Pat. No. 3,216,056 to Segur, dated Nov. 9, 1965, employs a pair of elongated spring arms which have notched ends that converge toward each other to plow the meat from the chicken legs as the connected bones are pulled relative to the stationary plowing means.

Still another U.S. Pat. No. 3,261,054, to Kaplan et al., dated July 19, 1966, is adapted to remove the meat from cooked chicken legs. The legs are moved between stripper bars and rotating cams release the bars when the joint between the thigh and lower leg is reached, the cams then permitting movement of the stripper bars toward each other to complete the stripping operation.

While the devices comprising the subject matter of each of the patents referred to above operate with various degrees of success for their intended purpose, it now has been found that there is a substantial market for chicken thighs per se from which the bone has been removed. Preferably, the bone is removed prior to cooking the thighs. Due to the fact that a chicken thigh has a ball, comprising part of a ball-and-socket joint, at each end of the thigh, appreciable difficulty is encountered in attempting to develop a machine or mechanism to remove the bone from the thigh, especially in view of the ball occurring at each end of the bone of the thigh. The relatively small size of a chicken thigh per se also offer difficulties in this regard.

SUMMARY OF THE INVENTION

It is the principal object of the present invention to provide a machine for automatically removing the bone from the thigh of a chicken leg by employing means to grip the ball at one end of the thigh bone and utilize stripper members to engage the bone directly adjacent to said gripping means and move longitudinally along the bone to cleanly strip the meat therefrom by the use of means to maintain said stripper members in close engagement with the thigh bone and employ additional means operable to move the stripper members around the ball at the opposite end of the thigh bone so as to cleanly strip the meat from the opposite end of the bone from which it is gripped without damaging the machine or shearing the bone.

It is another object of the invention to provide gripping means in the form of a pair of opposing blades which are operated by power means to firmly hold the thigh, while the stripper members comprise a pair of similar blades which also are operated by power means and respectively are provided with complementary notches which directly engage opposite sides of the thigh bone to effect the stripping of the meat therefrom.

A further object of the invention is to provide fluid-operated power means which, in particular, operates the gripping means and stripper members, while cam means are employed to effect certain other movements and operations of the machine.

Still another object of the invention is to provide a vertical supporting member which is rotatable uni-directionally about its axis, said member supporting a plurality of sets of gripping means and stripper members respectively mounted for separative movement in a vertical direction to effect the stripping operation referred to above simultaneously upon a plurality of thighs.

A still further object of the invention is to provide relatively simple but effective means for relaxing the pressure of the power means upon the stripper members when the ball at the lower end of the thigh is encountered so as to permit the stripper members to move closely and cleanly around said ball but, as soon as the ball has been passed, to effect restoration of the pressure upon the stripper members so as particularly to shear the stripped meat from the lower end of the ball.

Still another object of the invention is to provide a control means for said power means and the relaxation thereof for the foregoing purpose, said control means comprising a lever engageable at one end with the lower end of the thigh bone, while the opposite end engages the plunger of a control valve for the fluid pressure which controls the operation of the stripper member, the actuation of the plunger of the control valve being such that the valve is open when the stripper means engages the ball at the lower end of the blade but said opposite end of the lever rides over the plunger at the completion of such movement and thereby permits the valve to open again and restore pressure upon the gripper members to effect such aforementioned shearing operation.

Still further objects of the invention are to provide suitable means to initially hold but subsequently release the stripped meat from the holding means at a suitable discharge station, and also permit release and discharge of the stripped bone from the gripping means when a subsequent discharge station is reached to receive the stripped bones during the movement of the supporting means for the gripping means and stripper members.

Still another object of the invention is to provide an effective and efficient co-relation of cams and control valves for various fluid-operated devices which cooperate with each other to effect the completely automatic operation of the machine, except for the initial manual loading of thighs into the machine.

Still another object of the invention is to provide suitable safety means which operate instantaneously to stop the machine, in the event of a malfunction or accidental engagement of the person or clothing of an operator by any of the devices of the machine.

Details of the foregoing objects and of the invention, as well as other objects thereof, are set forth in the following specification and illustrated in the accompanying drawings comprising a part thereof.

DESCRIPTION OF THE DRAWINGS

FIG. 3 is a fragmentary top plan view of a portion of the machine shown in FIGS. 1 and 2 and especially illustrating safety means for stopping the actuation of the machine.

FIG. 4 is a top plan view of a portion of the machine shown in FIG. 1 as seen on the line 4—4 thereof.

DESCRIPTION OF THE PREFERRED EMBODIMENTS

Figure 1:
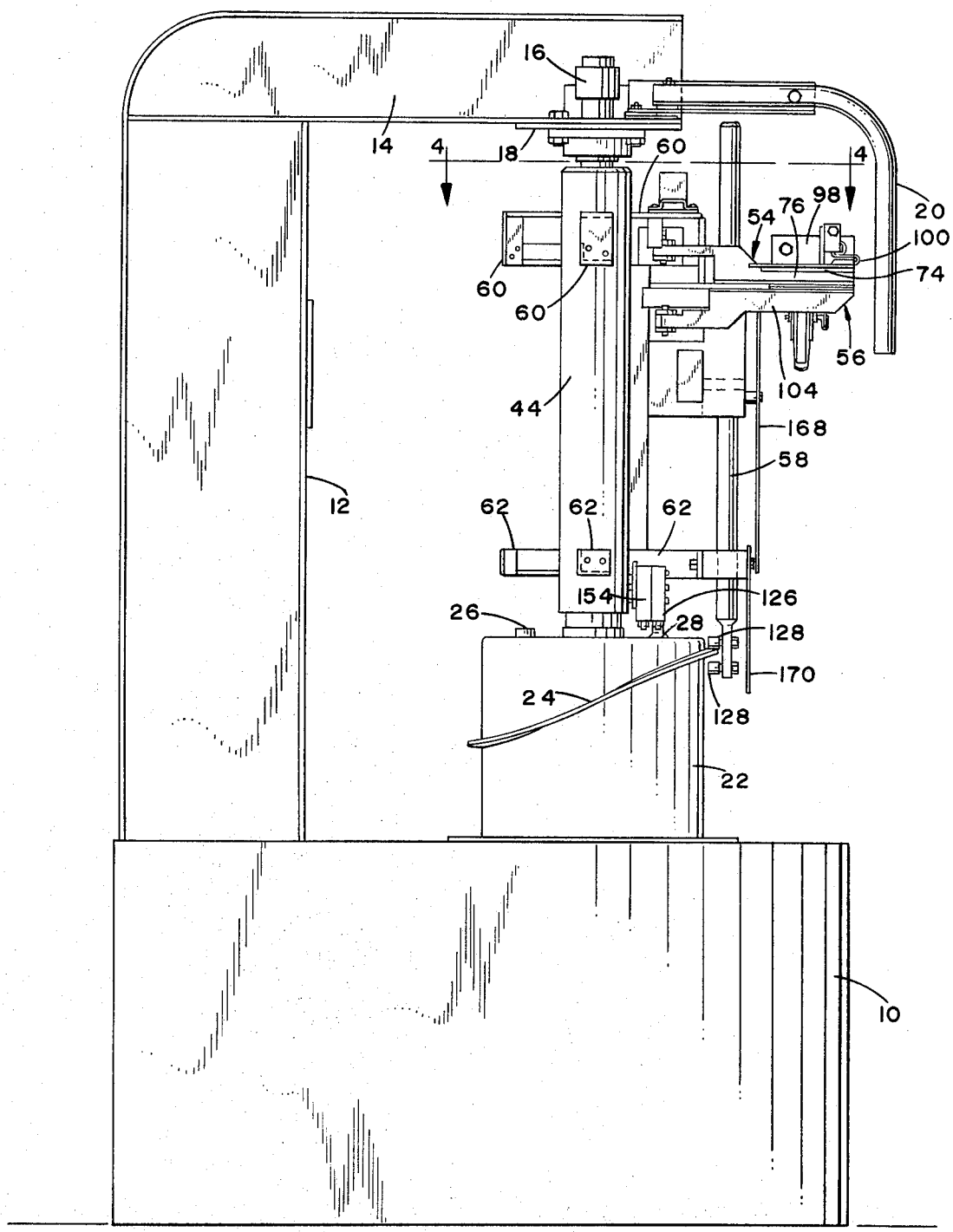
FIG. 1 is a side elevation of the entire machine comprising the subject matter of the present invention.
Figure 2:
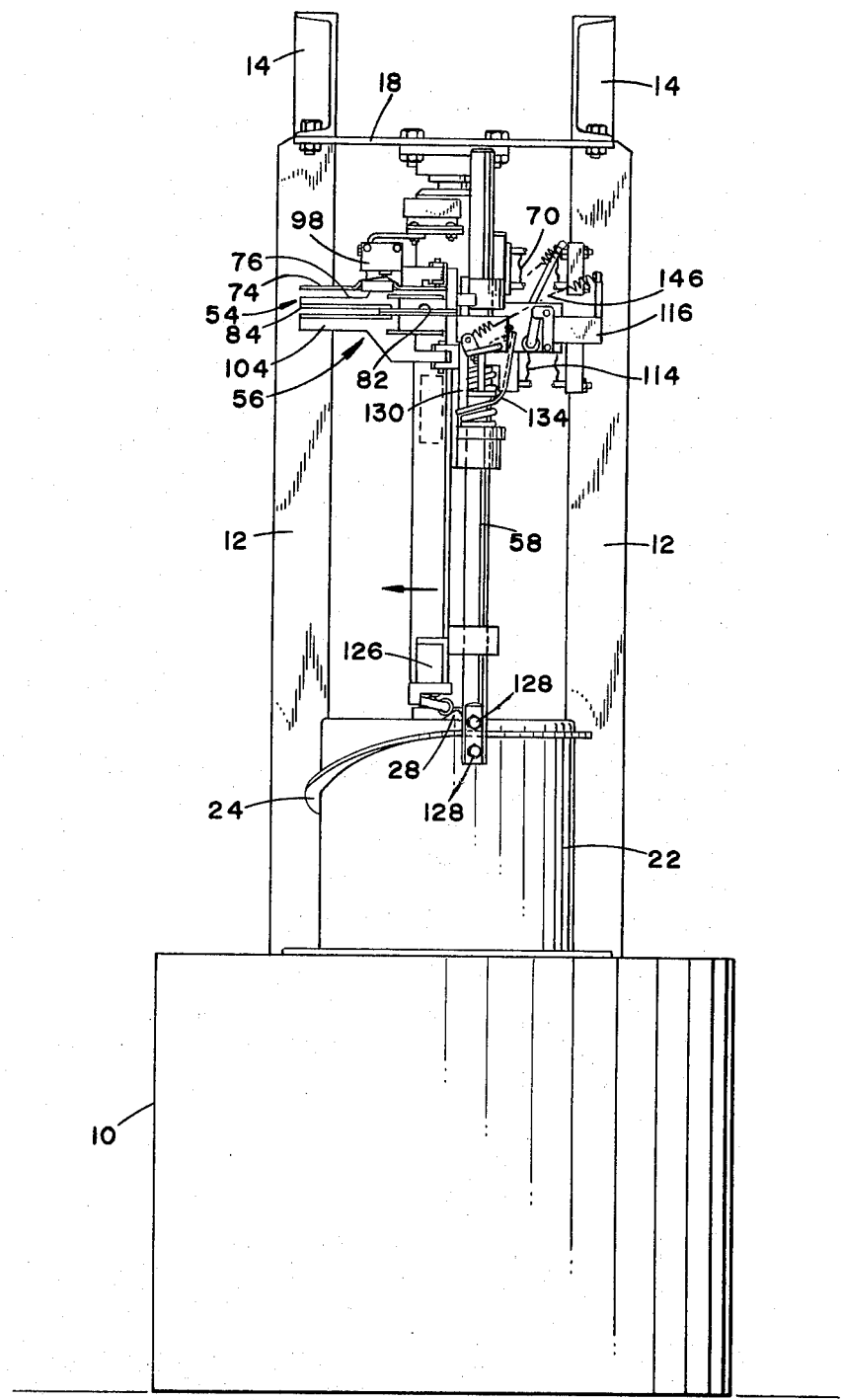
FIG. 2 is a front face view of the machine shown in FIG. 1.

Referring to FIGS. 1 and 2, the machine comprising the preferred embodiments of the present invention consists of a base 10 which comprises a metal shell enclosing certain operating mechanism described hereinafter. Fixed to the upper part of the rear portion of said base 10 is a pair of vertical frame members 12. A pair of horizontal, parallel frame members 14 are connected at one end to the upper ends of the frame members 12. The horizontal frame members 14 are parallel to and overhang the upper portion of the base 10 for purposes of supporting bearing means 16, shown in FIG. 1, which is mounted upon a horizontal plate 18 that extends between the forward portions of the frame members 14. The plate 18 also supports a safety lever 20 which is pivotally connected at its upper end to plate 18, the opposite end extending downwardly for ready engagement by an operator if an emergency occurs which requires instantaneous stopping of the machine.

Also supported from the upper surface of base 10 is a cylindrical housing 22 which supports a fixed, strip type cam 24. The top surface of said housing 22 also supports a pair of stubby stationary cams 26 and 28. The cams 24, 26, and 28 are for purposes to be described.

BASIC POWER MEANS

Figure 5:
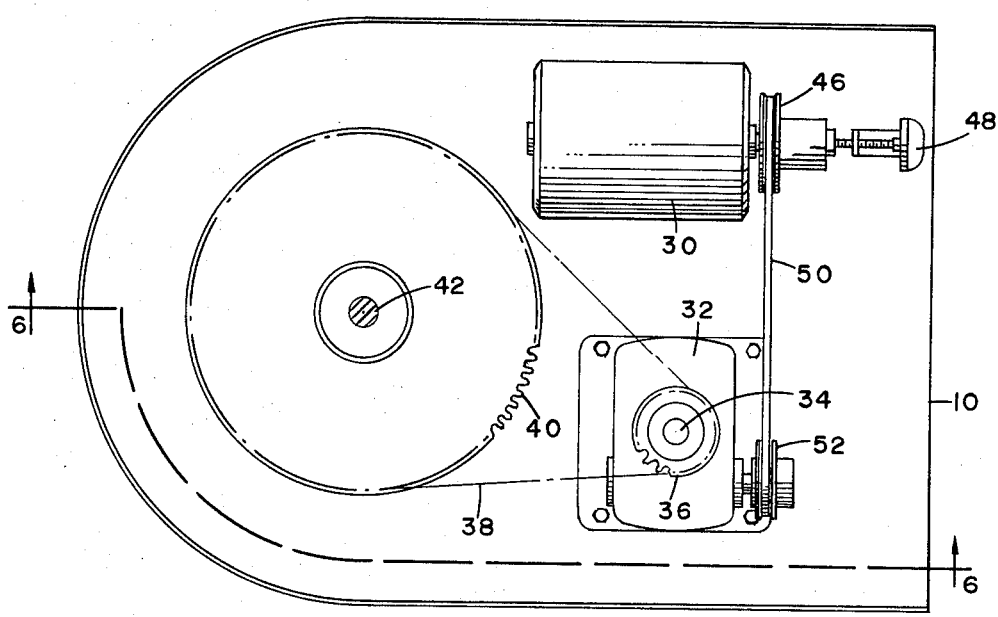
FIG. 5 is a sectioned top plan view of the base of the machine shown in FIGS. 1 and 2 as seen on the line 5—5 of FIG. 6.
Figure 6:
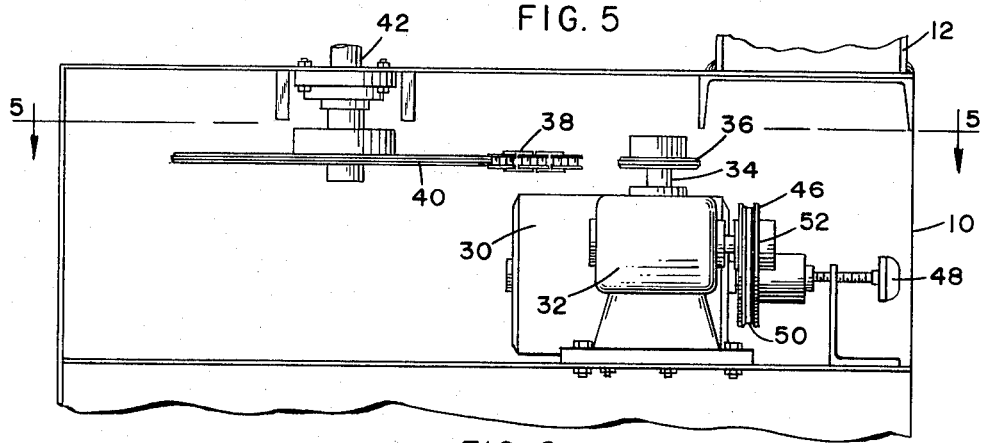
FIG. 6 is a fragmentary vertical sectional view of the base of the machine as seen on the line 6—6 of FIG. 5.
Figure 7:
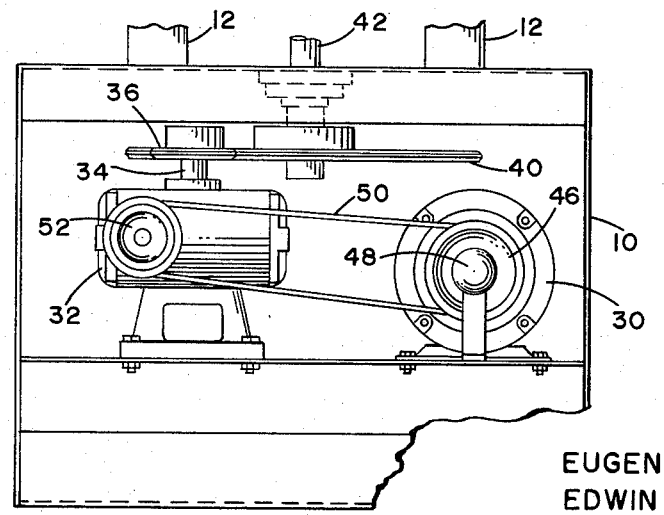
FIG. 7 is a fragmentary vertical elevation of the front face of the base of the machine shown in FIGS. 1 and 2 as seen from the right-hand end of FIG. 5 when the front vertical panel thereof is removed.

Referring to FIGS. 5–7, the base 10 contains an electric motor 30 which comprises power means to drive a gear reduction unit 32. A vertical shaft 34 supports a driving sprocket gear 36 which is connected by a sprocket chain 38 to a large diameter driven sprocket gear 40. The gear 40 is connected to the lower end of a vertical drive shaft 42, which extends upwardly though housing 22, and the upper end is supported by bearing 16.

A supporting sleeve 44 of substantially larger diameter than shaft 42 surrounds the same coaxially and is suitably secured thereto so as to be driven thereby uni-directionally. The motor 30 which supplies the power to drive the shaft 34 and sleeve 44 has a speed adjustable pulley 46 thereon which is adjusted by actuating a knob 48. An endless belt 50, such as V-belt, extends between the speed adjustable pulley 46 and a driven pulley 52 on the drive shaft for the gear reduction unit 32.

The supporting sleeve 44 supports a plurality of sets of gripping means for units 54 and pairs of stripping members 56 which include a vertical guide rod 58. Said sets of gripping means and stripping members as well as the guide rod 58 thereof are each supported by pairs of brackets comprising an upper bracket 60 and lower bracket 62. It will be seen from FIGS. 1 and 4 that only a single set of the gripping means or units 54 and pairs of stripping members 56 comprising a stripper unit are shown for purposes of simplifying the illustration. It is to be understood, however, that there are pluralities of cooperating sets of said gripping means 54 and stripping members 56 mounted at evenly circumferentially spaced locations about the vertical axis of the drive shaft 42, as readily can be visualized from FIG. 4, in which the angular disposition of the brackets 60, for example, are shown in detail. The brackets 62 respectively are vertically directly below brackets 60.

GRIPPING MEANS

The gripping means or unit 54 are best shown in FIGS. 4 and 4a. The unit comprises a horizontal supporting bar 64, which is fixed to bracket 60. Bracket 60 also has an extension 66 provided with a bearing through which guide rod 58 slidably extends. Bar 64 also has a pivot bracket 68 connected thereto. The bracket 60 also supports a fluid-operated cylinder 70, having a piston rod 72 projecting from one end thereof. As viewed in FIG. 4, the fluid cylinder 70 is below the bracket 60.

As seen in FIG. 4, there is an arcuate, flat plate 74 which extends to the outer end of bar 64 and, arcuately, it extends between bar 64 and pivoted arm 76, the outer end of which slidably moves beneath the plate 74. Arm 76 has a pivot bracket 78 fixed thereto and the same is pivotally connected by a bolt 80 to pivot bracket 68 on bar 64. The inner end of arm 76 is pivotally connected to the outer end of piston rod clevis 72 as also shown in FIGS. 4 and 4a. For purposes of clarity, in FIG. 4a, the plate 74 has been removed.

Bar 64 is stationary in operation with respect to bracket 60 and adjacent its outer end supports a blade 82 which comprises one of a pair of gripping blades, the other blade 84 being about reversely similar in shape and fixed to arm 76 and movable herewith for direct slidable engagement with the under surface of blade 82. The blades 82 and 84 each have a V-shaped notch in the outer free edges thereof between the opposite ends of said blades for purposes of defining a small space 84' when the blades are in closed position as shown in FIG. 4a. Said space is for purposes of receiving the ball at the upper end of a thigh bone of a chicken thigh and firmly gripping the same. Particularly, as indicated in FIGS. 9–12, the edges of the V-shaped notches are tapered so as to define cutting edges. The function of such edges is to cut a slight amount of the meat at the upper end of the thigh which is adjacent the upper ball 86 of the thigh bone 88 and thereby enable the blades 82 and 84 firmly to engage the upper ball 86.

Figure 9:
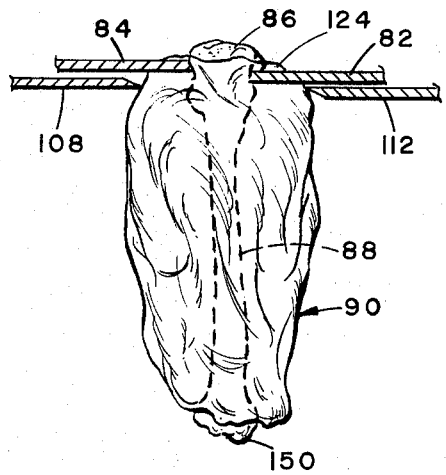
FIGS. 8–12 are exemplary successive views showing a typical chicken thigh in FIG. 8 and, commencing with FIG. 9, showing relative, successive views of exemplary engagement of gripping means and stripper members with the upper portion of the thigh adjacent the ball at said end thereof and then showing the progressive stripping movement of the stripper members to remove the meat from the bone of the thigh by movement of the stripper members away from the gripping means and toward the ball at the lower end of the bone.
Figure 8:
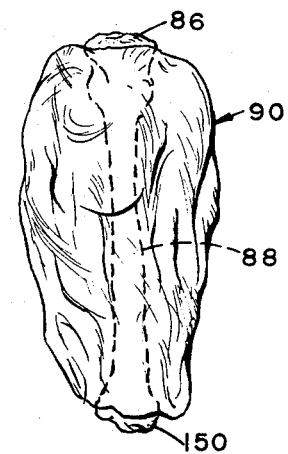

An exemplary thigh 90 per se is shown in FIG. 9, after the same has been separated from the lower leg portion of the entire leg of a chicken. Referring to FIG. 4, a stop bracket 92 is shown connected at one end to bracket 60, the outer end 94 thereof extending downwardly for engagement by the end of arm 76 which is connected to the piston rod 72 to limit the outward movement of said end of the arm and, correspondingly, the inward movement of the blade 84 with respect to blade 82.

Mounted on the upper surface of the arcuate plate 74 is a pneumatic relay 96 which is interconnected to and operates an air valve 98, see FIG. 2, which controls the operation of fluid cylinder 70. The fluid system, incidentally, preferably is pneumatic for purposes of eliminating any messy condition which would result from leakage of any portion of the fluid system of the entire machine if the same were hydraulic. However, it is to be understood that the invention is intended to encompass the use of hydraulic fluid, if that would be desired in preference to a pneumatic system. The pneumatic relay 96 is actuated by a very sensative lever 100 which, in vertical cross-section, is U-shaped, as can be appreciated from FIGS. 13 and 14. The same extends around the outer edge of arcuate plate 74 and the lower portion thereof is engaged by the upper end of a thigh when being positioned manually for engagement by the blades of the gripping means or unit 54.

When a thigh is being manually disposed for engagement between the notches of the gripper blades 82 and 84, a flexible ejecting band 102 which extends in a convex manner between the outer ends of bar 64 and arm 76, substantially in alignment with the outer edge of the arcuate plate 74 as seen in FIG. 4, is pushed inward into the exemplary dotted line position shown in FIG. 4a. The band 102 preferably comprises a strip of flexible plastic material readily capable of resuming its convex shape when the blades 82 and 84 are restored to the open or initial position thereof as shown in FIG. 4, from a closed or gripping position as shown in FIG. 4a. When the upper end of a chicken thigh is moved manually inward, it is just below the plate 74 for engagement by the blades 82 and 84 which are disposed slightly below plate 74 as shown in FIG. 2.

At the completion of a stripping operation, when the gripping plate 84 is moved away from blade 82 to its open position, shown in FIG. 4, the flexible member of 102 will move from its dotted line position shown in FIG. 4a to the position shown in FIG. 4, and in so doing will insure ejection of the stripped thigh bone from the machine at the ejection station described in detail hereinafter. Further, in view of the small scale of the mechanism shown in FIG. 2 with respect to certain of the details of the gripping means 54, and especially an end view thereof, attention is directed to FIGS. 13–16 in which many of the elements referred to above and hereinafter are shown in a larger scale.

STRIPPER MECHANISM

In plan view, the stripper mechanism 56 is directly below the gripping means 54 and therefore, in effect, for a plan view thereof, attention is directed to FIG. 4 for the relative positions of the blades of the stripper mechanism or unit 56 when in open position and to FIG. 4a when the same are in closed position. Otherwise, attention is directed to FIGS. 1 and 2, and particularly to FIGS. 13–16 wherein the following description will include the operation of the stripper mechanism in performing its primary function of stripping the meat from the thigh bone 88 due to downward movement of such mechanism relative to the gripping means 54 which is immovable vertically, whereby relative movement between the gripping means and the stripper mechanism longitudinally with respect to the axis of the thigh bone results in such stripping of the meat therefrom.

As best shown in FIGS. 13–16, the stripper mechanism 56 comprises an arm 104 which is pivotally supported by a pivot bracket 106 intermediately of the ends thereof. The arm 104 is very similar to the arm 76 of the gripper means 54 and, preferably, is directly below the same as viewed in FIGS. 4 and 4a. Arm 104 supports a stripper blade 108 which, in plan view, is similar to blade 84 of gripper means 54. A stationary arm 110, which is similar to arm 64 of the gripper means 54 supports a stationary stripper blade 112 which, in plan view, also is similar to the stationary gripper blade 82 of the gripping means 54. Therefore, the blades 108 and 112 have co-operable notches therein and the edges which define said notches are beveled to provide sharpened stripping edges as illustrated somewhat diagrammatically in FIGS. 9–12.

The opposite end of arm 104 from that shown in FIGS. 13–16 is interconnected to the piston rod, not shown, of fluid-operated cylinder 114. The cylinder 114, which preferably is pneumatically operated, is controlled by an air valve 116, having a plunger 118 projecting from one end thereof. The outer end of the plunger is engaged by a pivoted arm 120, which preferably has a roller actuator 122 on the outer end thereof. Operation of the air valve 116 is described in detail hereinafter.

OPERATION OF THE MACHINE

Electric motor 30 drives the drive shaft 42 which, in turn, rotates the supporting sleeve 44 at a predetermined speed which is reasonably rapid for efficiency of operation of the entire machine, yet is such that an operator, even with relatively little experience, can manually feed thighs to the machine as each set of gripping blades of each gripping unit 54 arrives at the loading station which is adjacent the safety lever 20. As viewed in FIG. 4, the machine rotates in a clockwise direction. Operation of the motor 30 is controlled by a master switch, not shown.

As each gripper unit 54 arrives at the loading station, an operator manually introduces the upper end of a chicken thigh against the flexible band 102 and engages the lever 100 to actuate relay 96, which, in turn, operates fluid cylinder 70 in a direction to move gripper blade 84 toward gripper blade 82 substantially instantaneously. When the thigh has thus been adequately gripped between blades 82 and 84, as illustrated in exemplary manner in FIG. 13, it will be seen that the upper ball of the thigh bone 88 is firmly gripped therebetween and incident to such gripping operation, a slight amount of meat will be sheared by said blades from the upper end of the thigh, such slight amount of excess meat 124, which is negligable, is best shown in FIGS. 9–12.

Figure 10:
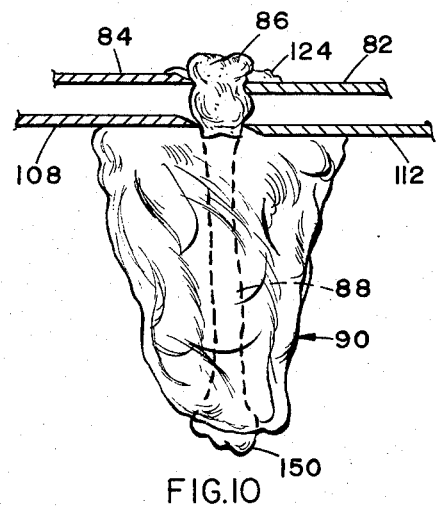

After a slight amount of additional rotational movement of the entire movable assembly of the machine which is carried by the supporting sleeve 44 has occurred, a switch 126, which is carried by bracket 62, as shown in FIGS. 1 and 2, will engage the stubby, stationary cam 28 and close the switch. Said switch is a relay to actuate the air valve 116 which moves the stripper blade 108 toward the stripper blade 112, whereby the sharpened edges of the notches in said blade will firmly and slidably engage the upper portion of the thigh bone 88, as shown in FIG. 10, immediately below the lower end of the ball 86 at the upper end of thigh bone 88.

The mechanism will be moving at this time in the direction of the arrow shown in FIG. 2. In this view, it will be seen that guide rod 58, which is connected at its upper end to block 66 and the stripper mechanism connected to block 136, is provided on its lower end with a pair of guide rollers 128, see FIG. 2, which respectively engage opposite surfaces of a bladelike cam 24. Said cam is endless and extends circumferentially around cylindrical housing 22.

Figure 13:
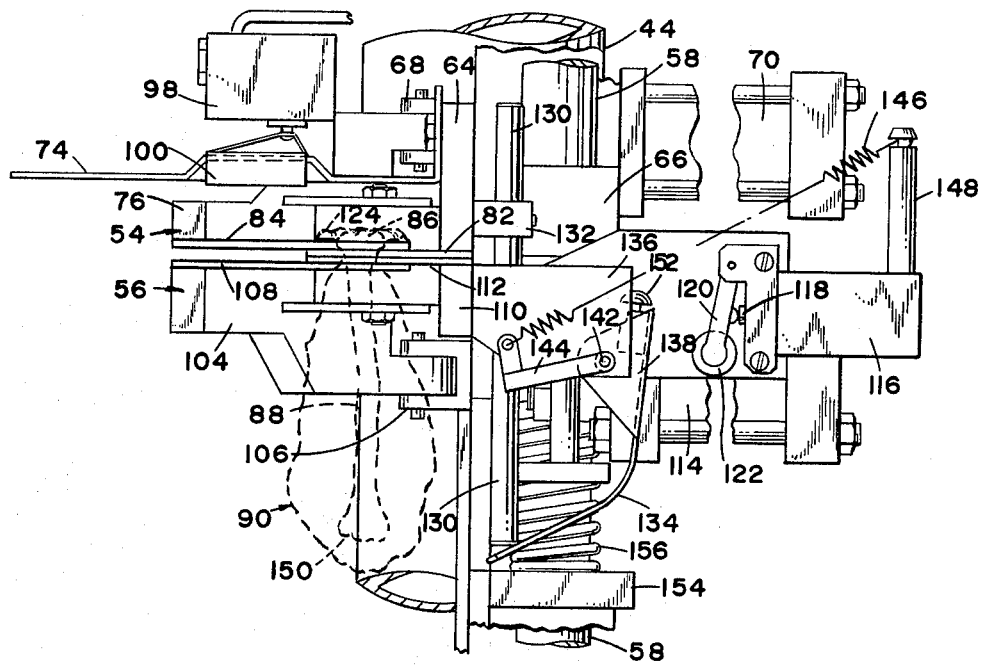
FIGS. 13–16 respectively are successive exemplary views of the supporting and actuating mechanism for the gripping means and stripper means shown in diagrammatic manner in FIGS. 9–12, and in particular, illustrating the control means by which the stripping members are permitted to move closely around the ball at the lower end of the thigh bone and, subsequently, said stripping members being moved together to shear the stripped meat from the lower end of the thigh bone.
Figure 14:
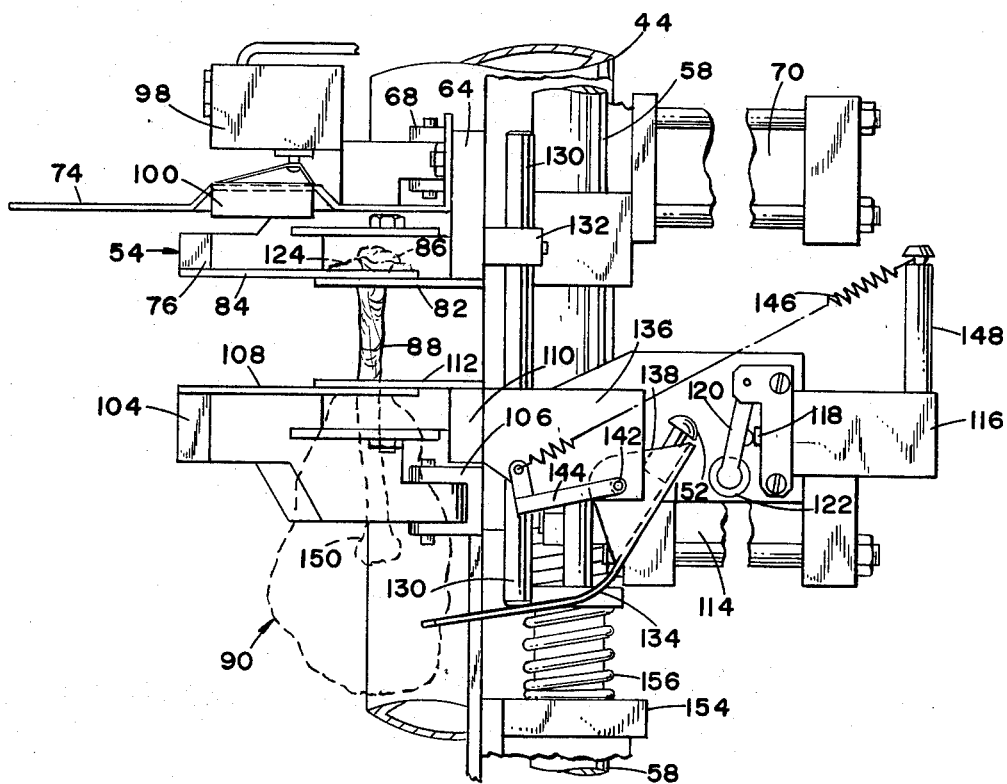

As shown in FIG. 2, the right-hand portion of cam 24 is substantially horizontal, while the left-hand portion descends to the lowest dwell portion. Rollers 128 on guide rod 58 are shown substantially at the commencement of the descending portion of the cam 24, and as the machine is moved in the direction of the arrow shown in FIG. 2, the rollers 128, incident to engaging the descending portion of cam 24, will commence to lower the stripper assembly 56. Referring to FIG. 14, it will be seen the stripper assembly has descended for a portion of the length of the thigh bone 88 and the meat 90 of the thigh, which is illustrated in phantom in FIGS. 13–16, is commencing to extend and spread below the lower end of the thigh bone. During such lowering movement, another operation is initiated, as follows:

In FIGS. 13–16, it will be noted that a rod 130 which is parallel to the axis of the supporting sleeve 44 and guide rod 58 is fixedly supported by a bracket 132. The lower end of said rod extends a substantial distance initially below the stripper blade assembly as seen in FIG. 13. The lower end of said rod engages a control lever 134 which is pivotally connected to block 136 which is fixed to arm 110.

Control lever 134 is provided with a pivot bracket 138, which engages pivot 142 on block 136. A biasing arm 144 also is fixed to the pivot 142 and moves with pivot bracket 138 when lever 134 is moved. The outer end of lever 134 is maintained in engagement with the lower end of rod 130 by means of coiled spring 146 which is connected between an extension on the outer end of biasing arm 144 and a fixed support such as post 148 carried, for example, by the outer end of air valve 116. Any other suitable supporting means than the post 148 may be utilized.

Figure 11:
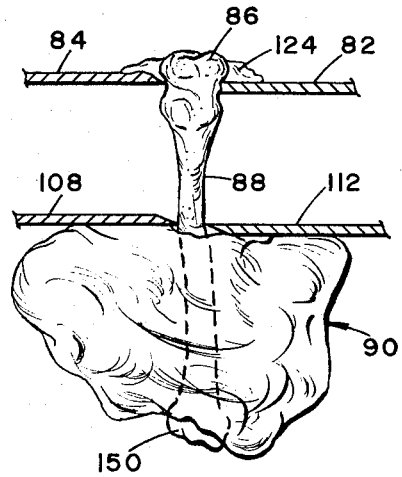
Figure 12:
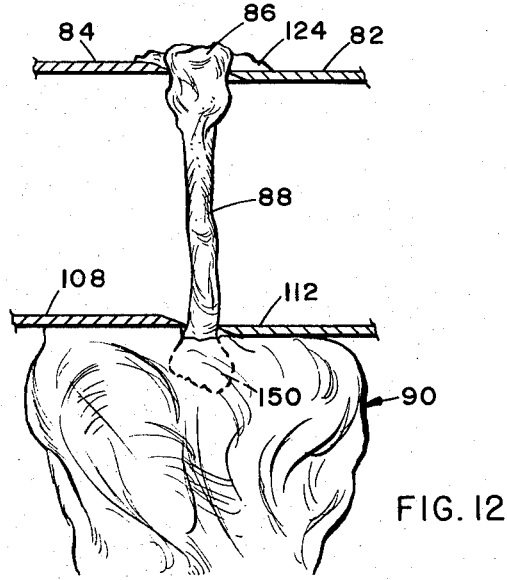
Figure 15:
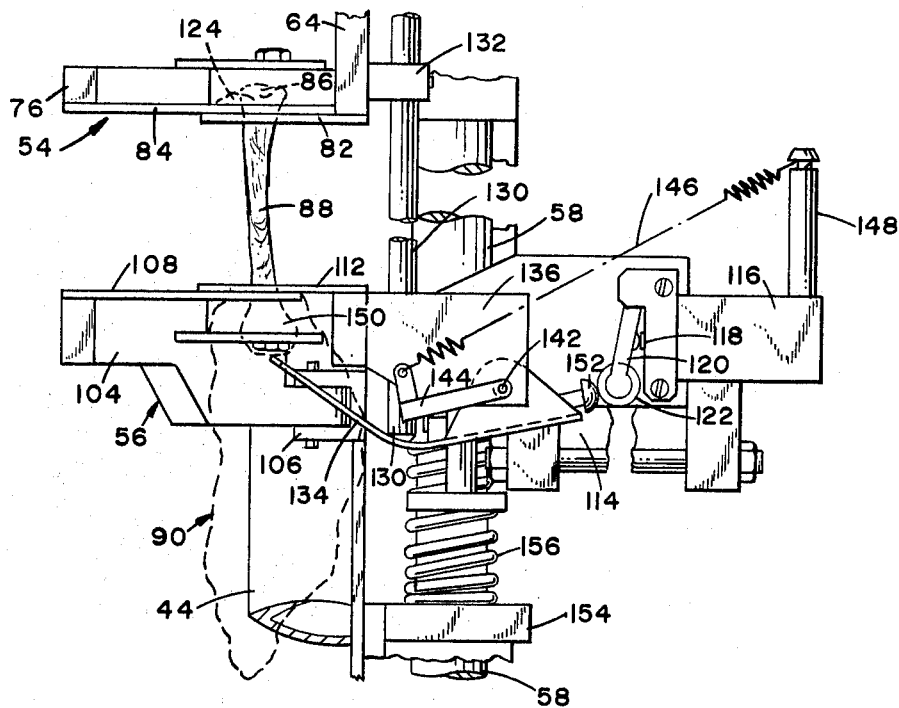

As the descending portion of cam 24 continues to cause movement of the guide rod 58 downwardly to carry the stripping unit 56 therewith, the meat of the thigh 90 is progressively stripped from the bone 88 as can be visualized by observing FIGS. 10 and 11, as well as FIGS. 14 and 15. With respect to FIG. 15, in particular, however, it will be noted that stripper blades 108 and 112 have reached the other ball 150 of bone 88 which is at the opposite or lower end of the thigh from the ball 86 which is engaged by the gripper blades 82 and 84.

During the lowering movement of the stripper blades 108 and 112 between the intermediate position shown in FIG. 14 and the still lower position shown in FIG. 15, the outer end of control lever 134 has been brought into engagement with the other ball 150 of the thigh bone 88, while still remaining in contact with the lower end of rod 130 due to the biasing action of spring 146. The end of control lever 134 which is nearest the pivot 142 supports a cam member 152, which preferably is adjustably carried by said end of lever 134. As the lever 134 approaches the position shown in FIG. 15, cam member 152 is moved into engagement with roller 122 on pivoted arm 120 which is moved counter-clockwise as viewed in FIG. 15 and thereby effects a movement of valve plunger 118 in the direction to close valve 116. This results in cylinder 114 relaxing its pressure which, until such time, has maintained stripper blade 108 in firm opposition against stripper blade 112 to effect stripping of the meat of thigh 90 from the bone 88.

Due to such relaxing in the pressure of cylinder 114, it is possible for stripper blade 108 to move slightly away from relatively fixed stripper blade 112 and thereby permit the notches in said blade to closely move over the contour of lower ball 150 during continued lowering movement of the stripper unit 56. However, the arrangement of the mechanism is such that as soon as the stripper blades 108 and 112 have cleared the sides of lower ball 150 of thigh bone 88, the lever 134 will have moved still further in clockwise direction, sufficiently to cause cam member 152 to ride over roller 122 of valve-actuating arm 120 and thereby permit the plunger 118, which preferably is spring pressed outwardly, by means not shown, and thus is restored to open position. This will restore pressure to cylinder 114 and instantly moves stripper blade 108 into shearing engagement with relatively stationary stripper blade 112, at least sufficiently to shear any remaining shreds of meat adhering to the lower ball 150.

Figure 16:
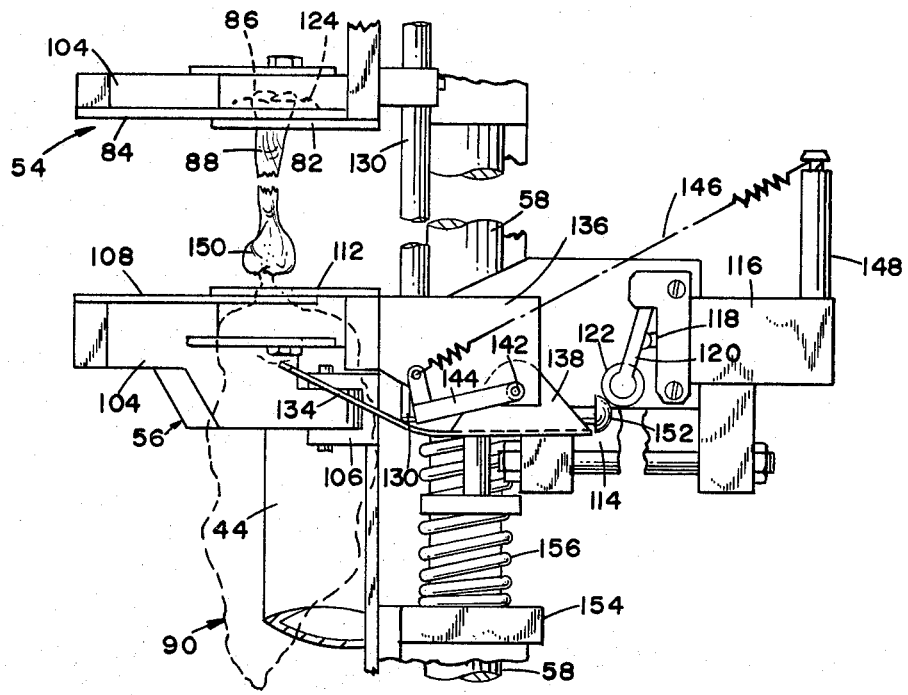

When the foregoing has occurred, however, the outer end of control lever 134 is in a position to hold the stripped meat of the thigh 90, as shown in FIG. 16 in diagrammatic manner, immediately below the closed blades 108 and 112. Meanwhile, the supporting sleeve 44 continues to move in clockwise direction as viewed in FIG. 4. After short additional rotational travel of the mechanism, an additional stubby cam 26 on top of housing 22 will be engaged by the operating plungers of switch 126 and an additional switch 154, which is immediately adjacent switch 126, and also is carried by the lower bracket 62 of each set of gripping and stripper units which are mounted upon the supporting sleeve 44. This will result in the switches 126 and 154 controlling the valves of both of the fluid cylinders 70 and 114 and causing them to exhaust their fluid to release pressure on the movable gripping and stripper blades and suitable means, such as springs, not shown, will engage such movable blades and restore the movable gripping blade 84 and movable stripper blade 108 to open position, such as shown in FIG. 4.

When the gripping blade 84 has been opened with respect to the relatively stationary gripping blade 82, the upper ball 86 of thigh bone 88, from which substantially all of the meat of the thigh has been stripped, will be released for engagement by the flexible ejecting band 102 which instantly will be moved from the dotted line position thereof shown in FIG. 4a, and will be snapped outwardly to the full line position thereof shown in FIG. 4. This will result in a quick ejection of the stripped thigh bone 88 at a location where the bone will be received in an appropriate receptacle, not shown.

The stripped meat of the thigh 90, shown in phantom in FIG. 16, will be held by the outer end of control lever 134 during a limited amount of additional rotational movement of all of the units carried by supporting sleeve 44 until a discharge station is reached which is prior in location to the loading station which is exemplified by the position of the gripping unit 54 and stripper unit 56 shown in FIG. 1. Such position also is near safety lever 20. From FIG. 1, it will be seen that the stationary cam 24 extends downwardly from the right-hand side of housing 22 to the left-hand side thereof as shown in said figure. In view of the fact that the cam 24 is endless, as shown in FIG. 4, for example, said cam, on the opposite side of housing 22 from that shown in FIG. 1, will rise. Accordingly, inasmuch as the follower or guide rollers 128 continually engage the cam 24, the rising portion of the cam will cause the guide rod 58 to rise as it approaches the loading station during its path of travel.

During such rising or elevation of the guide rod 58, it also will elevate the block 136 which is fixed thereto and to which the stripper unit 56 is connected. Accordingly, by considering FIGS. 13 through 16 in the reverse order, it will be seen that the lower end of rod 130 will progressively impinge upon the intermediate portion of control lever 134 slidably and due to the elevation of the block 136 and the stripper unit thereon, there will, in effect, be a relative lowering movement of the lower end of rod 130 relative to lever 134 until finally, as the lever 134 approaches its position illustrated in FIG. 13, for example, the stripped meat will fall therefrom at the aforementioned discharge station and be received in a suitable receptacle, not shown.

If, for example, during the elevational movement of the block 136 and the stripper unit 56 carried thereby, any obstruction should occur between the rising stripper unit 56 and the gripping unit 54 which is secured against vertical movement, such as by a thigh bone not being ejected, or an operator's hand accidentally being disposed between the two units, the following safety mechanism will be brought into operation.

Referring to FIGS. 13–16, it will be seen that the vertical guide rod 58 has a collar 154 fixed thereto. Surrounding the rod 58 and extending between the upper surface of the collar 154 and the lower end of block 136 is a coiled compression spring 156. Accordingly, while it has been stated hereinabove that the block 136 is fixed to the rod 58, such description is intended to mean that during normal operation of the machine, the block 136 is in relatively fixed position with respect to guide rod 58, such position being controlled by the pressure of spring 156 during such normal operation.

Upon any obstruction existing between the gripper unit 54 and the stripper unit 56 as referred to hereinabove, the shaft 58 will continue to rise due to the positive action of cam 24 as the rod 58 approaches loading position. However, if an obstruction exists between the aforementioned units, such obstruction will exert pressure upon the stripper unit 56, for example, and cause the spring 156 to compress while the rod 58 continues to move through the bearing in block 136 through which the shaft 58 extends. As a result, no serious damage will occur, either to the machine or any person operating the same. Upon the obstruction being cleared, the block 136 and the stripper unit 56 carried thereby will be restored by the spring 156 to the normal position thereof upon shaft 58.

As referred to hereinabove, the machine is provided with a safety lever 20, which is pivotally supported at one end upon a pivot 158, shown in FIG. 3, which is connected to horizontal plate 18 that extends between the horizontal frame members 14 at the upper end of the machine. The lever 20 normally is biased counter-clockwise by a spring 160 which moves the lever against an adjustable stop 162.

A safety switch 164 is connected in the power supply circuit, not shown, for the motor 30. Said switch is of a very sensitive type and is arranged to be opened by relatively slight movement of a pivoted actuating bar 166, the outer end of which slidably engages a suitable surface comprising part of the safety lever 20. Accordingly, when the safety lever 20 is moved counter-clockwise, the switch 164 will be opened and immediately stop the operation of the main drive motor 30 within the base 10 of the machine, which results in the entire machine being stopped. The switch 164 also is of the type that manual resetting of the same is required after the same has been opened to effect an emergency stopping of the motor 30. Suitable guard strips 168 and 170 are provided adjacent guide rod 58 also for safety purposes.

From the foregoing, it will be seen that the machine comprising the present invention provides a plurality of sets of cooperating gripper and stripper units respectively comprising pairs of blades which are moved between open and closed positions respectively to engage and firmly grip the ball at one end of a chicken thigh, while stripper blades effectively strip the meat from the thigh bone automatically. When the ball at the opposite end of the thigh bone is reached, additional automatically operated means permit the pressure upon the stripper blades to be relaxed so they will be able to move around said lower ball without injury to the mechanism or the bone, as well as the meat being stripped therefrom. However, as soon as the lower ball has been cleared, pressure is restored upon the stripper blades to effect shearing of the final shreds of meat tending to adhere to the lower end of the bone. Still further, automatically operated means effect discharge of the stripped bone and release the stripped meat from the machine for deposit in suitable receptacles provided respectively for said bones and meat.

The rate of speed at which the machine operates is such that a single operator readily can maintain the machine loaded with thighs and the speed of operation of the machine may be adjusted within reasonable limits to effect a desired operative speed thereof. Various safety means are provided to minimize the possibility of injury, either to the operator of the machine or the machine per se. In addition, various elements in the machine are adjustable and manipulation of the adjustment means readily may be effected without requiring any appreciable disassembly of the machine or special tools.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. A machine for removing meat from a chicken bone having enlargements at opposite ends comprising parts of joints, said machine comprising a pair of gripping members operable to engage the enlargement on one end of said bone, a pair of stripper blades operable to engage said bone at opposite sides thereof immediately adjacent the enlarged end engaged by said gripping members, power-operated means to effect relative movement between said gripping members and stripper blades in a direction substantially perpendicular to the plane of said stripper blades and longitudinally of said bone while said stripper blades slide along said bone to strip the meat from the bone, and fluid-operated means operable respectively to maintain said stripper blades and gripping members in close stipping and gripping engagement with said bone during relative movement between said bone and stripper blades for substantially the full length of said bone.

2. The machine according to claim 1 in which said gripping members comprise a pair of similar opposing flat members having opposing notches therein to engage a bone therebetween adjacent one end thereof, at least one of said members being supported for movement toward and from the other.

3. The machine according to claim 2 in which said opposing gripping members comprise a pair of parallel blades provided with said notches and respectively movable into engagement with opposite sides of the bone of a part of a chicken leg to receive said bone substantially in the depths of said notches.

4. The machine according to claim 1 in which said gripping members are mounted substantially within adjacent horizontal planes above said stripper blades and said relative movement between the same is in a vertical direction, whereby the thigh meat as stripped from the thigh bone is acted upon by gravity to carry the same away from said bone as stripped therefrom and said bones when stripped may fall automatically by gravity when released from said gripping members.

5. The machine according to claim 4 in which said stripper blades comprise a pair of parallel flat blades which are pivotally connected and are also parallel to said gripping members, said stripper blades also being movable toward and from each other within a substantially horizontal plane.

6. The machine according to claim 5 further including cam means interconnected to said stripper blades and operable to move the same away from said gripping members in a direction extending substantially longitudinally of the bone from which the meat is being stripped.

7. The machine according to claim 6 further including a support for said stripper blades and an additional support for said gripping members, one of said supports being movable substantially along a vertical axis with respect to the other support to effect said movement of said stripper blades away from said gripping members and said cam means being stationary upon said machine.

8. The machine according to claim 4 in which said fluid-operated means includes valves to control the operation thereof to effect relative movement between said stripper blades and gripping members toward and from each other, one of said control valves being mounted for engagement by a part of a chicken leg when the same is placed in said machine to operate said gripping members to firmly engage one end of said part of a chicken leg, and said machine also including cam means operable to actuate another of said valves which is operable to energize said stripper blades to effect movement of the same toward each other and into stripping engagement with the bone of said part of a chicken leg.

9. The machine according to claim 1 in which said means to maintain said stripper blades in close engagement with said bone comprises power means, said machine further including control means interconnected to said power means and operable to relax the force of said power means when the enlargement at the opposite end of said bone is reached during the movement of said stripper blades along said bone, whereby said stripper blades may move sufficiently in separating direction to permit movement of the same around said enlargement at said opposite end of said bone and thereby not fracture the bone.

10. The machine according to claim 9 in which said fluid-operated power means permits limited yieldability in the engagement of said stripper blades with said bone while moving longitudinally therealong.

11. The machine according to claim 10 further including a control valve interconnected to said fluid-operated power means, said control valve having actuating means engageable with the opposite end of the bone being stripped and operable to relieve the fluid power for said stripper blades when said enlargement is reached at the opposite end of said bone during stripping movement of said stripper blades longitudinally along said bone.

12. The machine according to claim 11 further including a support for said stripper blades and guide means therefor to guide said support for vertical movement, said actuating means for said stripper blades being actuated incident to relative separating movement occurring between said stripper blades and said gripping members.

13. The machine according to claim 12 in which said machine further includes a support for said gripping members and said support having a member positioned to be engaged by said actuating means for said control valve for said stripper blades when said enlargement at the opposite end of said bone.

14. The machine according to claim 13 in which said control valve for said stripper blades has an actuating plunger and the actuating means for said valve comprises a pivoted lever having one end engageable with the lower end of the bone during one end engageable with the lower end of the bone during at least the latter portion of said stripping operation therealong, the opposite end of said lever being positioned to engage said actuating plunger upon said control valve and being operable to close the valve to relax the pressure of said fluid-operated means upon said stripper members when the same engage said enlargement on the lower end of said bone and thereby permit said stripper blades to move slightly away from each other so as to pass around said enlargement on the lower end of said bone but said opposite end of said pivoted lever further being adapted to ride over said valve plunger when said stripper members have passed said enlargement on the lower end of said bone and thereby permit said fluid pressure to be restored to said power means to close said stripper blades toward each other and thereby shear the meat from below said lower enlargement on said bone.

15. The machine according to claim 14 in which the end of said pivoted lever which engages said bone is positioned to support the meat removed from said bone until the machine has effected movement of said gripping members and stripper blades to a discharge station in said machine, and said machine further including means to actuate said lever to discharge said meat which has been stripped from said bone when said discharge station is reached by said lever.

16. The machine according to claim 15 further including additional means adapted to effect release of said gripping members from the upper end of the thigh bone from which the meat has been stripped and thereby permit discharge of the stripped bone from the machine.

17. The machine according to claim 16 further including additional cam means operable to restore said gripping members and the stripper blades to initial starting position following the removal of the stripped bone from said gripping members and the removed meat from said stripper blades.

18. The machine according to claim 1 including a member extending vertically and rotatable uni-directionally and in which machine a plurality of sets of said gripping means and stripper members are mounted at circumferentially spaced locations around said member, said machine also including power means operable to rotate said vertical member and carry said sets of gripping members and stripper blades therewith successively between loading and discharge stations upon said machine, and cam means on said machine operable to effect movement of said stripper blades successively away from the gripping members of each set thereof upon said machine, fluid-operated means upon said machine operable to actuate successively said sets of gripping members and stripper blades, and actuating valves for said fluid-operated means positioned upon said machine suitably to effect sequential operation of said sets of gripping members and stripper blades.

19. The machine according to claim 18 in which said gripper members are operated by one of said actuating valves, said valve having an actuator positioned to engage the part of a chicken leg when held in stripping position in the machine, said machine including fixed cam means operable to commonly release all gripper members at the end of each cycle of operation of each set of gripper members and stripper blades.

20. The machine according to claim 19 further including additional cam means operable to restore said stripper blades to starting position with respect to the gripper members of each set thereof after completion of a cycle of operation of each set of said means.

* * * * *